(12) United States Patent
 Bodziony et al.

(10) Patent No.: US 11,030,212 B2
(45) Date of Patent: Jun. 8, 2021

(54) REDIRECTING QUERY TO VIEW MASKED DATA VIA FEDERATION TABLE

(71) Applicant: INTERNATIONAL BUSINESS MACHINES CORPORATION, Armonk, NY (US)

(72) Inventors: Michal Bodziony, Tęgoborze (PL); Marcin Filip, Cracow (PL); Monika Piatek, Cracow (PL); Lukasz S. Studzienny, Cracow (PL); Andrzej Laskawiec, Cracow (PL); Tomasz Zatorski, Cracow (PL); Marcin Luczynski, Cracow (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 203 days.

(21) Appl. No.: 16/123,568

(22) Filed: Sep. 6, 2018

(65) Prior Publication Data

US 2020/0082010 A1     Mar. 12, 2020

(51) Int. Cl.
 *G06F 16/25*      (2019.01)
 *G06F 16/248*     (2019.01)
 (Continued)

(52) U.S. Cl.
 CPC ........ *G06F 16/256* (2019.01); *G06F 16/2282* (2019.01); *G06F 16/248* (2019.01); *G06F 21/6218* (2013.01)

(58) Field of Classification Search
 CPC .. G06F 16/256; G06F 16/248; G06F 16/2282; G06F 21/6218
 (Continued)

(56) References Cited

U.S. PATENT DOCUMENTS

| 6,253,203 B1 * | 6/2001 | O'Flaherty | ......... G06F 21/6245 |
| 6,275,824 B1 * | 8/2001 | O'Flaherty | ......... G06F 21/6227 |

(Continued)

FOREIGN PATENT DOCUMENTS

| EP | 2741237 A1 * | 6/2014 | ....... G08B 13/19686 |
| GB | 2552574 A  * | 1/2018 | ......... G06F 21/6254 |

(Continued)

OTHER PUBLICATIONS

Stack Overflow, "Data Masking or Security using Views?" dated Jul. 18, 2018, accessed online at <https://stackoverflow.com/questions/51405085/data-masking-or-security-using-views> on Nov. 5, 2020. (Year: 2018).*

(Continued)

*Primary Examiner* — Phuong Thao Cao
(74) *Attorney, Agent, or Firm* — Scott Dobson; Andrew D. Wright; Roberts Calderon Safran & Cole, P.C.

(57) ABSTRACT

A computer-implemented method includes: receiving, by a computer device, a database query of a database from a database client; determining, by the computer device and based on the database query, a to-be-masked portion of data; sending, by the computer device, the database query to a federated database system for the to-be-masked portion of the data; receiving, by the computer device and in response to the sending, masked resultant data from the federated database system; and forwarding, by the computer device, the masked resultant data to the database client. The to-be-masked portion of the data is masked in at least one view of the database residing on the federated database system.

18 Claims, 3 Drawing Sheets

(51) Int. Cl.
*G06F 16/22* (2019.01)
*G06F 21/62* (2013.01)

(58) Field of Classification Search
USPC .......................................................... 707/722
See application file for complete search history.

(56) References Cited

U.S. PATENT DOCUMENTS

| | | | |
|---|---|---|---|
| 7,191,169 B1* | 3/2007 | Tao | G06F 16/24539 707/714 |
| 8,122,008 B2 | 2/2012 | Li et al. | |
| 8,146,165 B2 | 3/2012 | Manickam et al. | |
| 8,402,017 B2* | 3/2013 | Bender | G06F 16/217 707/717 |
| 8,826,370 B2 | 9/2014 | Boukobza | |
| 8,930,382 B2* | 1/2015 | Branish, II | G06F 16/972 707/757 |
| 9,135,315 B2 | 9/2015 | Barbas et al. | |
| 9,600,193 B2* | 3/2017 | Ahrens | G06F 3/067 |
| 2004/0034651 A1* | 2/2004 | Gupta | G06F 16/25 |
| 2004/0078300 A1* | 4/2004 | Smith | G06Q 30/02 705/26.1 |
| 2004/0158550 A1* | 8/2004 | Jardin | G06F 16/24561 |
| 2006/0122964 A1* | 6/2006 | Yu | G06F 16/2393 |
| 2007/0220004 A1* | 9/2007 | Fifield | G06F 16/2448 |
| 2009/0049511 A1* | 2/2009 | Manickam | G06F 21/6254 726/1 |
| 2009/0063453 A1* | 3/2009 | Adler | G06F 16/2471 |
| 2009/0063524 A1* | 3/2009 | Adler | G06F 16/29 |
| 2010/0042643 A1* | 2/2010 | Pattabhi | G06F 16/256 707/757 |
| 2011/0106789 A1* | 5/2011 | Gao | G06F 16/2471 707/713 |
| 2011/0113050 A1* | 5/2011 | Youn | G06F 21/6218 707/757 |
| 2011/0246538 A1* | 10/2011 | Boley | G06F 16/2428 707/805 |
| 2012/0109926 A1* | 5/2012 | Novik | G06F 16/256 707/707 |
| 2012/0197919 A1* | 8/2012 | Chen | G06F 16/00 707/757 |
| 2012/0246696 A1* | 9/2012 | Bou Kobza | G06F 21/6254 726/1 |
| 2013/0036110 A1* | 2/2013 | Scott | G06F 21/6218 707/722 |
| 2013/0086088 A1* | 4/2013 | Alton | G06F 16/2455 707/754 |
| 2013/0138627 A1* | 5/2013 | Zaydman | G06F 16/2453 707/714 |
| 2013/0167192 A1* | 6/2013 | Hickman | G06F 21/60 726/1 |
| 2013/0282697 A1* | 10/2013 | Barbas | G06F 16/24553 707/722 |
| 2014/0025704 A1* | 1/2014 | Jin | G06F 16/9535 707/770 |
| 2014/0380051 A1* | 12/2014 | Branish, II | G06F 21/6227 713/169 |
| 2015/0039902 A1* | 2/2015 | Arya | G06F 7/74 713/189 |
| 2015/0096037 A1* | 4/2015 | Padmanabhan | G06F 21/6245 726/26 |
| 2015/0113659 A1* | 4/2015 | D'Costa | G06F 21/6254 726/26 |
| 2015/0310067 A1* | 10/2015 | Svoboda | H04L 63/20 707/781 |
| 2016/0224797 A1* | 8/2016 | Schrock | G06F 16/2291 |
| 2017/0124139 A1 | 5/2017 | Farkash et al. | |
| 2017/0293530 A1* | 10/2017 | Brodt | G06F 16/2365 |
| 2017/0339111 A1 | 11/2017 | Balabine et al. | |
| 2019/0102154 A1* | 4/2019 | Koupy | G06F 8/453 |
| 2019/0303614 A1* | 10/2019 | Do | G06F 21/6254 |
| 2019/0377820 A1* | 12/2019 | Kruempelmann | G06F 8/70 |
| 2020/0042737 A1* | 2/2020 | Lee | G06F 16/2282 |

FOREIGN PATENT DOCUMENTS

| | | | | |
|---|---|---|---|---|
| KR | 100820306 B1 * | 4/2008 | ......... | G06F 21/6254 |
| KR | 20110022104 A * | 3/2011 | | |

OTHER PUBLICATIONS

Unknown, "Informatica Dynamic Data Masking", Informatica White Paper, 2012, 12 pages.
Unknown, "DataSunrise Data Masking for Oracle", DataSunrise, Inc., 2018,<https://www.clatasunrise.com/masking/oracle/> accessed May 23, 2018, 6 pages.

* cited by examiner

REDIRECTING QUERY TO VIEW MASKED DATA VIA FEDERATION TABLE

BACKGROUND

The present invention relates generally to database queries and, more particularly, to database queries that might require masking to prevent a database client from viewing certain information in the database.

Databases are queried by database clients in order for the clients to view particular data in the database. A particular client can have a policy assigned to it that applies specifically to that client and indicates through various parameters what data in the database the client is permitted to view or otherwise have access to. A policy can also exist for non-client specific criteria.

SUMMARY

In a first aspect of the invention, there is a computer-implemented method including: receiving, by a computer device, a database query of a database from a database client; determining, by the computer device and based on the database query, a to-be-masked portion of data; sending, by the computer device, the database query to a federated database system ("FDBS") for the to-be-masked portion of the data; receiving, by the computer device and in response to the sending, masked resultant data from the FDBS; and forwarding, by the computer device, the masked resultant data to the database client. The to-be-masked portion of the data is masked in at least one view of the database residing on the FDBS. In embodiments, a database view (for example, an SQL view) contains a query to a remote database table combined with data masking.

In another aspect of the invention, there is a computer program product including a computer readable storage medium having program instructions embodied therewith. The program instructions are executable by a computing device to cause the computing device to: receive a database query from a masking proxy for a to-be-masked portion of data in a database; perform the database query on at least one view of the database in the computing device to generate a masked resultant data; and forward the masked resultant data to the masking proxy.

In another aspect of the invention, there is system including a processor, a computer readable memory, and a computer readable storage medium. The system includes: program instructions to receive a database query of a database from a database client; program instructions to determine, based on the database query, a to-be-masked portion of data; program instructions to send the database query to a FDBS for the to-be-masked portion of the data; program instructions to receive, in response to the sending, masked resultant data from the FDBS; and program instructions to forward the masked resultant data to the database client. The to-be-masked portion of the data is masked in at least one view of the database residing on the FDBS, and the program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to database queries and, more particularly, to database queries that might require masking to prevent a database client from viewing certain information in the database. In accordance with aspects of the invention there is a method of masking data to be delivered in response to a data query directed from a database client to a database with data arranged in a data table having data table structure. In embodiments, the method includes: (1) receiving from the database client the data query directed to the database; (2) intercepting the data query with a masking proxy, the masking proxy using a policy to decide which of the data, to be delivered in response to the data query, shall be masked and which of the data shall not be masked; (3) for any of the data that is not to be masked, directing the data query in an unchanged manner to the database, the database sending to the masking proxy the data as a response to the data query; and (4) for any of the data that is to be masked, directing the data query to a FDBS, the FDBS having access to a database view which has a structure that is identical to the data table structure of the data table in the database, the FDBS retrieving the data from the database and performing data masking thereon, the FDBS sending to the masking proxy the masked data as a response to the data query, and the masking proxy forwarding to the database client the data received from the FDBS and from the database.

Advantageously, embodiments of the invention provide improvements to the functioning of a database server/computing device. More specifically, aspects of the invention utilize the unconventional steps of splitting the database searching function into a masked portion and an unmasked portion and sending only the unmasked portion to the original database, while the masked portion is sent to a FDBS, to enable the database server/computer device to operate more efficiently. Thus, a technical solution to the technical problem of limited computing capacity is provided.

In many data processing environments there is a need to enforce data masking. Data masking can be enforced by a proxy introduced between a client and an application relational database. Such a proxy analyzes each request to the database (possibly a SQL statement) and based on a query, connection properties, and/or information about user/client, decides that some aspects of the data have to be masked.

One method of masking by proxy is post processing, where the stream of data is intercepted and masking is applied. Drawbacks of post processing are (1) that the proxy itself may be not capable to process a huge volume of data, and (2) that the data has to be passed unmasked between the database and the proxy, which is not always acceptable.

Another method of masking by proxy is query rewriting, where the query is rewritten before passing to the database. This approach is not always applicable because (1) query rewriting requires parsing and re-formatting of the query, which can be time consuming and therefore costly, and (2) the database is not always capable of doing the specific hashing algorithms that are required for the desired masking.

Embodiments of the invention redirect the query to another database which has views built on top of federated tables from the original database. In embodiments, the data masking is performed on these views, not on the original database.

A masking proxy is a component which intercepts requests (queries) issued by a database client. In embodiments, the masking proxy has a built-in or external source of policies/heuristics which are used to decide which data is to be masked and which is not. If there is no need to perform data masking, the query is directed unchanged to the original database. If masking is required, then the query is redirected to a FDBS. The FDBS has the functionality of data masking on a view of the original database. For example, the structure of view "TAB 1" at the FDBS is identical to a table "TAB 1" in the original database. The views can be created in runtime (by the masking proxy) or can be pre-created based on the same policies which are used by the masking proxy. Because the query issued by the database client may join tables which require masking with other tables (that don't require masking), the FDBS can have views for all the tables used by the query.

In embodiment, the steps to enforce data masking via a masking proxy include: (1) the database client issues a query which uses both tables which requires masking and tables that does not require masking; (2) the query is intercepted by the masking proxy; (3) the query details, connection properties, client details, and/or information about the database are used as input for the determination of the appropriate policy; (4) if the policy states that masking is not required then the query is directed to the original database; (5) if the policy states that masking is required, then all tables which are used by the query are federated on the FDBS; (6) views are created on the FDBS for each table in the original database that is required by the query; (7) views for tables which requires data masking are created in a way that data from the original database is masked in the views; (8) the query is redirected to the FDBS and there is no need to modify the query itself; and (9) the data is retrieved via the FDBS from the original database and returned via the masking proxy to the database client.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
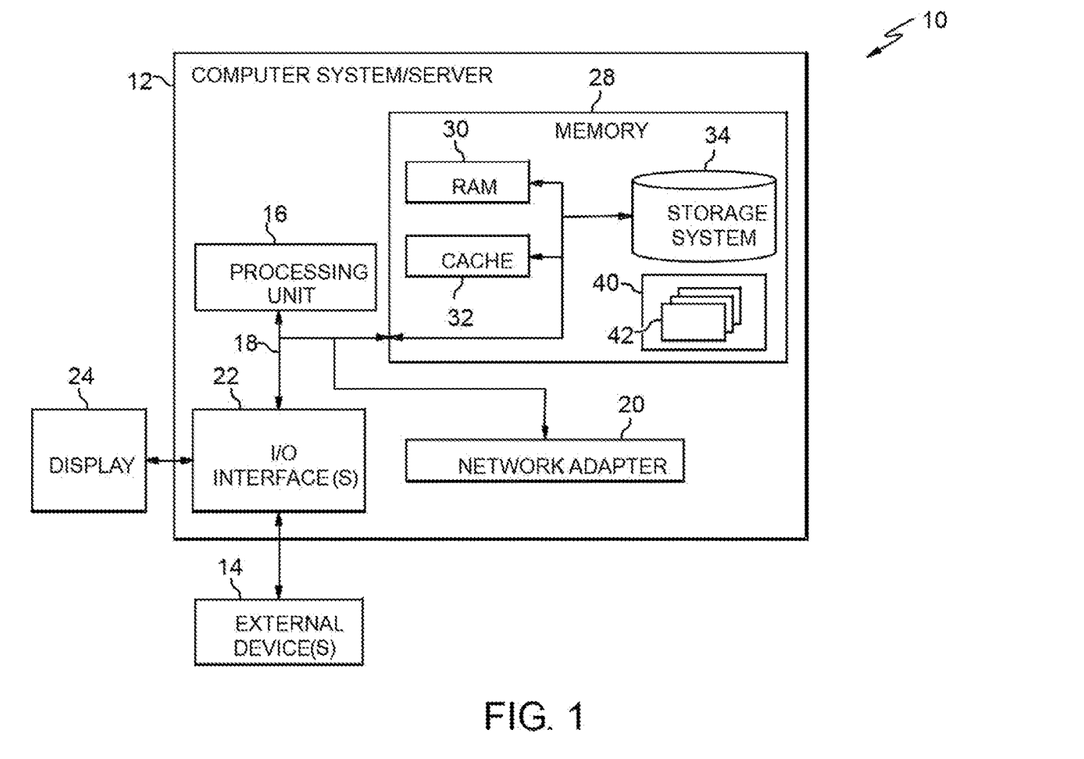
FIG. 1 depicts a computer infrastructure according to an embodiment of the present invention.

Referring now to FIG. 1, a schematic of an example of a computer infrastructure is shown. Computer infrastructure 10 is only one example of a suitable computer infrastructure and is not intended to suggest any limitation as to the scope of use or functionality of embodiments of the invention described herein. Regardless, computer infrastructure 10 is capable of being implemented and/or performing any of the functionality set forth hereinabove.

In computer infrastructure 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computer infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
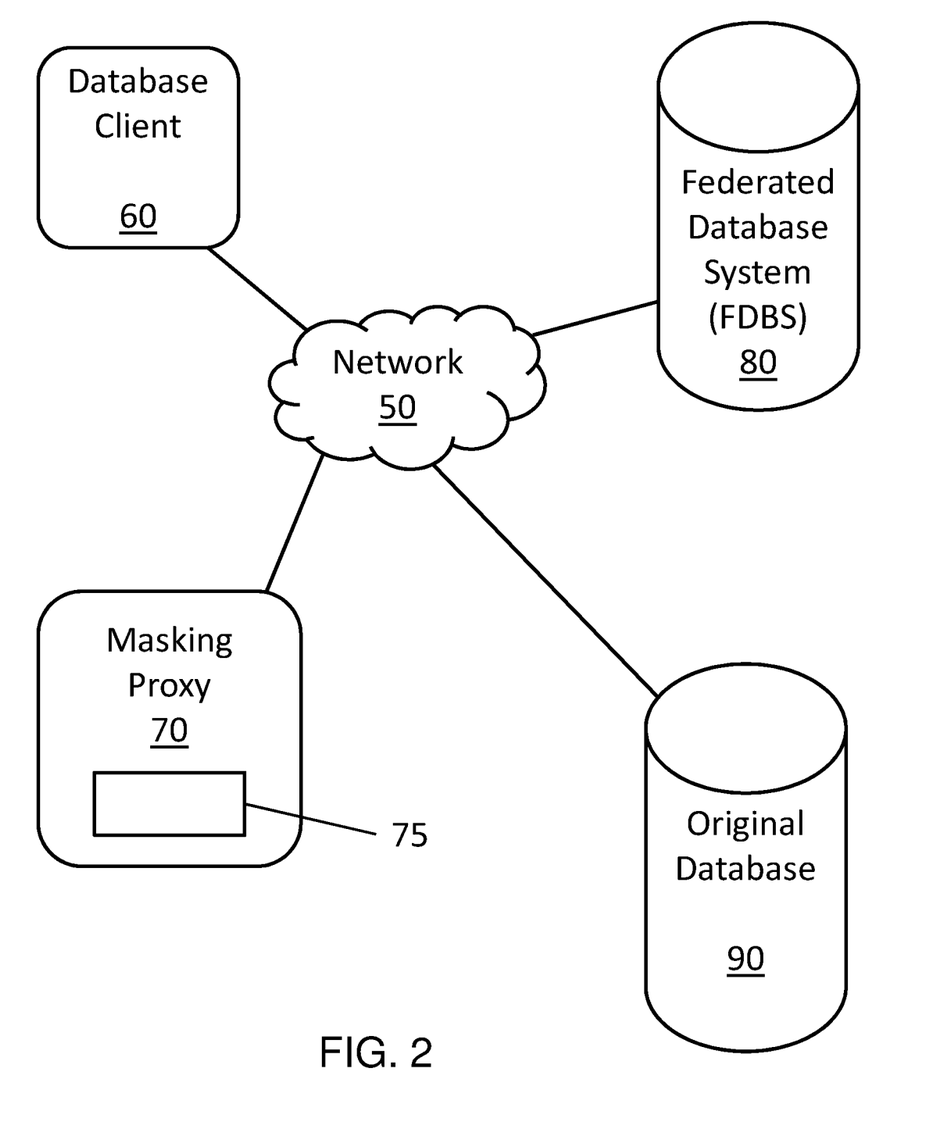
FIG. 2 shows a block diagram of an exemplary environment in accordance with aspects of the invention.

FIG. 2 shows a block diagram of an exemplary environment in accordance with aspects of the invention. In embodiments, the environment includes a network 50 that is in the form of any suitable communications network or combination of networks, such as a local area network (LAN), a general wide area network (WAN), and/or a public network (e.g., the Internet). In embodiments, the connections shown in FIG. 2 are in the form of wireless connections and/or hardware connections between the various elements shown in FIG. 2.

In embodiments, the environment includes a database client 60 that requests access to data in an original database 90 by submitting a query to the original database 90. In embodiments, the database client 60 is a computer device of an individual, a business entity, or other entity or device that has access to at least a portion of the data associated with the original database 90. In embodiments, the original database 90 is in the form of the computing system 12, and may be a server bank, single server, desktop computer, laptop computer, tablet computer, etc.

In embodiments, the environment includes a masking proxy 70 which is a computer device (such as computer system 12) including has a program module 75 (for example program module 42) that is configured to perform one or more of the processes described herein. In aspects, the masking proxy 70 intercepts the query submitted by the database client 60 to the original database 90 and, according to restrictions that are part of a profile that is associated with the database client 60, determines the data in the original database 90 that the database client is permitted to access. Non-exclusive examples of information that can be a part of the profile for the database client 60 are user I.D., location of client, subscription level of client, role of client, etc. The masking proxy 70 can also apply restrictions that are non-client specific such as time of day, day of the week, security threat level, and/or other non-client specific information. The masking proxy 70, based at least in part on the profile of the database client 60 and/or the non-client specific information, determines what, if any, data in the original database 90 the database client 60 is not permitted to access. The data that the database client 60 is not permitted to access is masked by the masking proxy 70 to prevent access by the database client 60. In accordance with aspects of the invention, the masking proxy 70 sends the query to the original database 90 to process that part of the data in the original database 90 that does not require masking, and sends the query to a FDBS 80 to process that part of the data in the original database 90 that does require masking.

In embodiments, in response to receiving the query from the masking proxy 70, the original database 90 searches the data in the original database 90 to produce unmasked resultant data from that part of the data in the original database 90 that does not require masking.

In embodiments, the FDBS 80 is in the form of the computing system 12, and may be a server bank, single server, desktop computer, laptop computer, tablet computer, etc. In embodiments, the FDBS 80 creates and/or houses views of the original database 90 that are used to perform searches in accordance with the query. In response to receiving the query from the masking proxy 70, the FDBS 80 searches the views on the FDBS 80 to produce masked resultant data.

In embodiments, the original database 90 sends the unmasked resultant data to the masking proxy 70, and the FDBS 80 sends the masked resultant data to the masking proxy 70. The masking proxy 70 forwards the unmasked resultant data and the masked resultant data to the database client 60 as the results of the query. The results of the query received by the database client 60 can contain both masked data and unmasked data. In embodiments, the masked data contains asterisks or other characters in place of data that the database client 60 is not permitted to see. For example, a view NTAB1 on the FDBS 80 is a nickname for a table TAB1 in the original database. In this example, view NTAB1 is created in part by the command "AS SELECT col1, col2, '******' as col3 FROM NTAB1" which results in Column 3 of the view being masked with asterisks. Other ways of data masking can also be used. For example, the following command uses hashing which returns a value of the same length: "CREATEW VIEW TAB1 AS SELECT col1, col2, aes(sha256(col3),length(col3)) as col3 FROM NTAB1".

Figure 3:
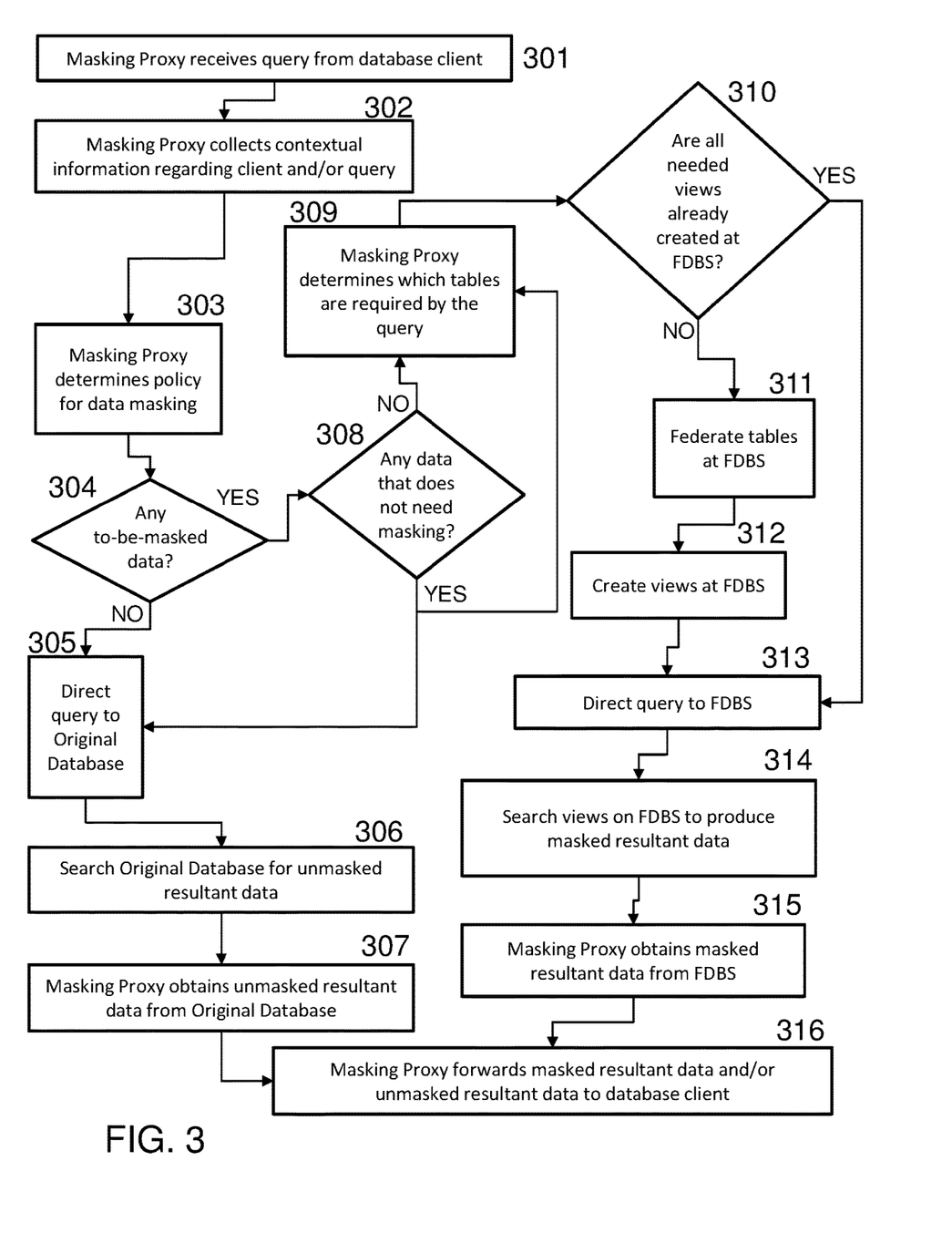
FIG. 3 shows a flowchart of an exemplary method in accordance with aspects of the invention.

FIG. 3 shows a flowchart of an exemplary method in accordance with aspects of the present invention. Steps of the method may be carried out in the environment of FIG. 2 and are described with reference to elements depicted in FIG. 2.

At step 301, the masking proxy 70 receives a query from the database client 60. As described herein, the database client 60 may comprise a computer device used by an entity that has access to at least a portion of the data associated with the original database 90. For example, the database client 60 may comprise a computer device of a subscriber to a database service that provides the financial information of a large number of people, and the original database 90 contains the financial information. In this example, the database client 60 may be used by a lender that wants to see information that is relevant to the database client's customer's creditworthiness. In this example, the original database 90 contains mortgage loan payment history, automobile loan payment history, utility payment history, bank account balances, investment account balances, income history, credit card history, tax payment history, and other information related to a person's finances. In this example, step 301 includes the lender using the database client 60 to submit a query to the original database 90 to review information that is relevant to the database client's customer's creditworthiness. This example of the contents of the database 90 is just one example and is not to be construed as limiting in any way.

In embodiments, different database clients 60 have different authorization levels where the authorization level determines what pieces of the data that particular database client is authorized to access. For example, Lender A has authority to view tax payment history information in the original database, but Lender B does not. In other examples, Lender A has authority to access information in the original database only during normal business hours, where Lender B has no time-of-day limitation. In other embodiments, other limitations apply. In embodiments, the authorization level of a particular database client 60 is defined in a profile associated with that particular database client 60.

At step 302, the masking proxy 70 collects contextual information regarding the database client 60 and/or the database query. Examples of the contextual information include user authorization level, user status (a normal database user as opposed to an administrator, for example), geographical location of the user, time of day, day of the week, information about the server housing the database, subscription level, etc. In embodiments, contextual information such as authorization level, user status, and subscription level is obtained from a profile associated with the database client 60 that submitted the query at step 301. In embodiments, contextual information such as geographical location of the user, time of day, day of the week, information about the server housing the database is obtained by analyzing system data that is accessible by the masking proxy 70.

At step 303, the masking proxy 70 uses the contextual and/or other information to determine the appropriate policy for masking the data. The policy is what determines which data is to be masked so that the database client 60 cannot see/have access to it, and which data does not need to be masked so that the database client 60 can see/have access to it. In embodiments, the policy is defined in data stored at the masking proxy 70 (or data that is accessible by the masking proxy 70).

At step 304 and based on the determine policy, the masking proxy 70 determines whether the query involves data that requires masking ("to-be-masked data"). If the answer at step 304 is NO, indicating that no data masking is needed, then processing continues to step 305 where the masking proxy 70 directs the database query to the original database 90. In embodiments, step 305 includes the masking proxy 70 instructing the original database 90 to perform the database query on the unmasked portion of the data to produce unmasked resultant data.

At step 306 the original database 90 applies the database query (from step 301) to the data in the original database 90 to produce query results with no masking. These results are referred to as unmasked resultant data.

At step 307, the masking proxy retrieves the unmasked resultant data from the original database 90. The unmasked resultant data is, at this point, ready to be transmitted to the database client 60, which is done at step 316. Having the unmasked resultant data pass through the masking proxy between the database client 60 and the original database 90 prevents direct access to the original database 90 by the database client 60. Preventing database client 60 having direct access to the original database 90 can increase security and decrease database corruption.

Returning now to step 304, if the answer at step 304 is YES, indicating that there is some to-be-masked data, then processing continues to step 308. At step 308, the masking proxy 70 determines whether there is any data that does not need masking. While a NO result at step 304 indicates a case where no data masking is needed (i.e., the query causes only unmasked data to be returned), a YES at step 308 indicates a case where some data needs masking and some data does not (i.e., the query causes the return of both masked data and unmasked data).

If the result of step 308 is YES, then processing continues to step 305 where the masking proxy 70 directs the database query to the original database 90 to query only that portion of the data in original database 90 that does not require masking. At step 306 the original database 90 applies the database query to the data in the original database 90 to produce the unmasked resultant data. As explained above, at step 307, the unmasked resultant data is retrieved from the original database 90 by the masking proxy 70. The unmasked resultant data is, at this point, ready to be transmitted to the database client 60 by the masking proxy 70, which is done at step 316. However, in contrast to the case where there is no data that requires masking, in this case since some of the data does require masking and some does not, the unmasked resultant data waits to be joined with masked resultant data (described below) before being forwarded to the database client 60 at step 316 by the masking proxy 70. If the result of step 308 is YES, the query results in both unmasked data and masked data, and processing also continues to step 309, which is discussed in detail below.

A NO result at step 308 indicates a case where only masked data will be produced (no unmasked resultant data will be produced). This is because, at step 304 the existence of data that requires masking was indicated and, at step 308, it was additionally determined that there is no data that does not need masking. As a result, there is only data that needs masking, and there is no data that does not need masking. With a NO result at step 308, processing continues to step 309.

At step 309, the masking proxy 70 determines which tables of the original database 90 are required by the query. The query is performed on views (which reside on the FDBS 80) of the tables of the original database 90 (which reside in the original database 90). A view is a link to a table in the original database 90 and has the same table structure as the table in the original database 90, but does not include the data that is to be masked. As a result, none of the data that is not to be accessed by the database client 60 exists on the FDBS 80. This increases the security of the data that is not to be accessed by the database client 60 by having it only reside on the original database 90. Performing the query on the FDBS 80 instead of on the original database 90 also helps conserve the computing capacity of the original database 90.

At step 310, the masking proxy 70 determines whether all of the views that are needed to perform the query exist on the FDBS 80. In embodiments, step 310 comprises determining whether any of the used views are non-existent on the FDBS 80 by checking a registry in the computing device. If all of the views that are needed to perform the query exist on the FDBS 80, then processing proceeds to step 313. If all of the views that are needed to perform the query do not exist on the FDBS 80, then processing proceeds to step 311, where the FDBS 80 federates the required tables from the original database 90. A federated table is a local representation of a remote table. In this case the local representation resides on the FDBS 80 and the remote table resides on the original database 90.

At step 312, the FDBS 80 produces the required views that do not already exist on the FDBS 80. The views are the tables on which the query is performed. In embodiments, the views perform data masking on the data that is not to be accessed by the database client 60. For example, during the view creation the FDBS 80 specifies how the data is to be masked. As a result, in embodiments, the data that is not to be accessed by the database client 60 does not reside on the FDBS 80. Because the query is performed on the views on the FDBS 80, and the views do not contain any of the data that is not to be accessed by the database client 60, the data that is not to be accessed by the database client 60 does not leave the original database 90. However, in some cases masking is not random. It can be hash calculated based on original value or noise added to the original value. In embodiments, some data masking algorithms retrieve data from the original database and send it unmasked to the FDBS 80. In embodiments, the views created by the FDBS 80 have a table structure that is identical to a data table structure of a database table in the original database 90.

At step 313, the masking proxy 70 directs the database query to the FDBS 80. In embodiments, step 313 comprises the masking proxy instructing the FDBS 80 to perform the database query on at least one view of the database residing on the FDBS 80 to produce masked resultant data.

At step 314, the database query is performed by the FDBS 80 on the views to produce the masked resultant data. In embodiments, the database query performed by the FDBS 80 on the views to produce the masked resultant data is the same database query that is used on the original database 90 in step 306.

At step 315, the masking query 70 obtains the masked resultant data from the FDBS 80.

At step 316, the masking proxy 70 forwards the masked resultant data and/or the unmasked resultant data to the database client 60 as the results of the query. As discussed above, some queries will result in only masked resultant data, some queries will result in only unmasked resultant data, and some queries will result in a combination of masked and unmasked resultant data. At step 316, the masking proxy 70 combines whatever resultant data that is produced in steps 306 and 314.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    receiving, by a computer device, a database query of a database from a database client;
    determining, by the computer device and based on the database query, a to-be-masked portion of data, the to-be-masked portion of the data including data that is not to be accessed by the database client;
    sending, by the computer device, the database query to at least one view of the database for the to-be-masked portion of the data, the at least one view of the database residing on a federated database system and containing none of the data that is not to be accessed by the database client;
    receiving, by the computer device and in response to the sending, masked resultant data from the federated database system;
    determining, by the computer device and based on the database query, an unmasked portion of the data;
    directing, by the computer device, the database query to the database for the unmasked portion of the data;
    receiving, by the computer device and in response to the directing, unmasked resultant data from the database;
    combining, by the computing device, the masked resultant data and the unmasked resultant data to form combined data; and
    forwarding, by the computer device, the combined data to the database client,
    wherein the to-be-masked portion of the data is masked in the at least one view of the database.

2. The computer-implemented method of claim 1, wherein the federated database system is configured to perform the database query on the at least one view to generate the masked resultant data.

3. The computer-implemented method of claim 2, wherein the database is configured to:
    perform the database query on the unmasked portion of the data in the database to generate the unmasked resultant data; and
    forward the unmasked resultant data to the computer device.

4. The computer-implemented method of claim 1, wherein the determining the to-be-masked portion of the data comprises applying a policy associated with the database query.

5. The computer-implemented method of claim 4, wherein the policy is associated with the database client.

6. The computer-implemented method of claim 1, further comprising:
    determining, by the computer device, tables of the database used to create the at least one view of the database used by the federated database system; and
    determining, by the computer device, whether any of the used views are non-existent on the federated database system.

7. The computer-implemented method of claim 6, wherein the determining whether any of the used views are non-existent on the federated database system comprises checking a registry in the computer device.

8. The computer-implemented method of claim 6, wherein the federated database system is configured to:
    federate from the database to the federated database system any of the tables used to create the used views that are non-existent on the federated database system;
    create any of the used views that are non-existent on the federated database system; and
    perform the database query on the at least one view to generate the masked resultant data.

9. The computer-implemented method of claim 8, wherein the views created by the federated database system have a table structure that is identical to a data table structure of a database table in the database.

10. The computer-implemented method of claim 1, wherein the query of the views by the federated database system and query used by the database to search the unmasked portion of the data are the database query.

11. The computer-implemented method of claim 1, wherein a service provider at least one of creates, maintains, deploys and supports the computer device.

12. The computer-implemented method of claim 1, further comprising determining, by the computer device, tables of the database used to create the at least one view of the database used by the federated database system,
   wherein only the tables used to create the at least one view are federated on the federated database system, and
   the database query sent to the at least one view is unmodified compared to the database query directed to the database.

13. A computer program product, the computer program product comprising a computer readable storage medium having program instructions embodied therewith, the program instructions executable by a computing device comprising a federated database system to cause the computing device to:
   receive a database query from a masking proxy for a to-be-masked portion of data in a database, the to-be-masked portion of the data including data that is not to be accessed by a database client;
   perform the database query on at least one view of the database in the computing device to generate a masked resultant data, the at least one view of the database being created from tables that are federated from the database and contain none of the data that is not to be accessed by the database client;
   determine, based on the database query, an unmasked portion of the data;
   direct the database query to the database for the unmasked portion of the data;
   receive, in response to the directing, unmasked resultant data from the database;
   combine the masked resultant data and the unmasked resultant data to form combined data; and
   forward the combined data to the database client.

14. The computer program product of claim 13, the program instructions further cause the computing device to:
   federate, from the database and based on the database query, tables used to create a required view of the at least one view that is non-existent on the computing device;
   create, based on the database query, the required view that is non-existent on the computing device.

15. The computer program product of claim 14, wherein the database query comprises a query of the at least one view by the computing device and a query used by the database to search an unmasked portion of the data.

16. The computer program product of claim 14, wherein the created required view has a table structure that is identical to a data table structure of a database table in the database.

17. A system comprising:
   a processor, a computer readable memory, and a computer readable storage medium;
   program instructions to receive a database query of a database from a database client;
   program instructions to determine, based on the database query, a to-be-masked portion of data, the to-be-masked portion of the data including data that is not to be accessed by the database client;
   program instructions to send the database query to at least one view of the database for the to-be-masked portion of the data, the at least one view of the database residing on a federated database system and containing none of the data that is not to be accessed by the database client;
   program instructions to receive, in response to the sending, masked resultant data from the federated database system;
   program instructions to determine, based on the database query, an unmasked portion of the data;
   program instructions to direct the database query to the database for the unmasked portion of the data;
   program instructions to receive, in response to the directing, unmasked resultant data from the database;
   program instructions to combine the masked resultant data and the unmasked resultant data to form combined data; and
   program instructions to forward the combined data to the database client,
   wherein the to-be-masked portion of the data is masked in the at least one view of the database, and
   the program instructions are stored on the computer readable storage medium for execution by the processor via the computer readable memory.

18. The system of claim 17, further comprising:
   program instructions to determine tables of the database used to create the at least one view of the database used by the federated database system; and
   program instructions to determine whether any of the used views are non-existent on the federated database system.

* * * * *